Jan. 9, 1968    J. R. SIBLEY    3,362,518

LOADING APPARATUS

Filed March 28, 1966    2 Sheets-Sheet 1

INVENTOR.
JOHN R. SIBLEY
BY
his ATTORNEY

Jan. 9, 1968  J. R. SIBLEY  3,362,518
LOADING APPARATUS
Filed March 28, 1966  2 Sheets-Sheet 2

INVENTOR.
JOHN R. SIBLEY
BY
his ATTORNEY ately along line 4—4 of FIG. 1 with the drive disk ro-
United States Patent Office 3,362,518
Patented Jan. 9, 1968

3,362,518
LOADING APPARATUS
John R. Sibley, Franklin, Pa., assignor to Joy Manufacturing Company, Pittsburgh, Pa., a corporation of Pennsylvania
Filed Mar. 28, 1966, Ser. No. 537,782
11 Claims. (Cl. 198—10)

ABSTRACT OF THE DISCLOSURE

An improved gathering head for a mobile loader having a center ramp extending forwardly and downwardly and side decks extending laterally and downwardly from the ramp with the forward edges of the side decks extending laterally and rearwardly with respect to the forward edge of the ramp. A gathering arm on each side deck powered by driven shafts normal to the respective decks, the driven shafts being rotated by obtuse angled gearing.

This invention relates to a material loading apparatus and particularly to an improved gathering head for a mobile loading apparatus of the frontal attack type.

Such an improved gathering head can take various forms, while the preferred embodiment comprises a planar center ramp disposed longitudinally downwardly with respect to the main frame of the loading apparatus, and side planar decks disposed both longitudinally downwardly with respect to the main frame and laterally downwardly with respect to the ramp. The forward edge of the ramp extends generally transversely with respect to the frame and the forward edges of the decks extend laterally and rearwardly from the forward edge of the ramp to form a somewhat pointed trapezoidal penetrating edge for the gathering head. A gathering arm is mounted on each of the decks and is driven through a drive disk rotatable about an axis perpendicular to the deck. Each gathering arm moves in an endless path closely adjacent the surface of the deck and overlapping a forward portion of a rearwardly extending conveyor and extending forwardly beyond the forward penetrating edge of the gathering head. A drive gear arrangement is disposed beneath each deck and has two like drive shafts both of which are operably connected with the drive disk, with one of such drive shafts being connected with a source of motive power and the other being operably connected with the conveyor. The centerlines of the drive shafts intersect on the perpendicular axis of the drive disk. Equal angles formed between the centerlines and the perpendicular axis are greater than 90° by an amount equal to the lateral inclination of the decks. The drive gear arrangement is further symmetrical about a plane bisecting the angle between the centerlines of the drive shafts, and is mounted on a planar support surface parallel to the plane formed by the centerlines of the drive shafts. The support surfaces under each deck are coplanar.

Various advantages of the present invention will become apparent upon consideration of the following description and drawings, in which.

Figure 1:
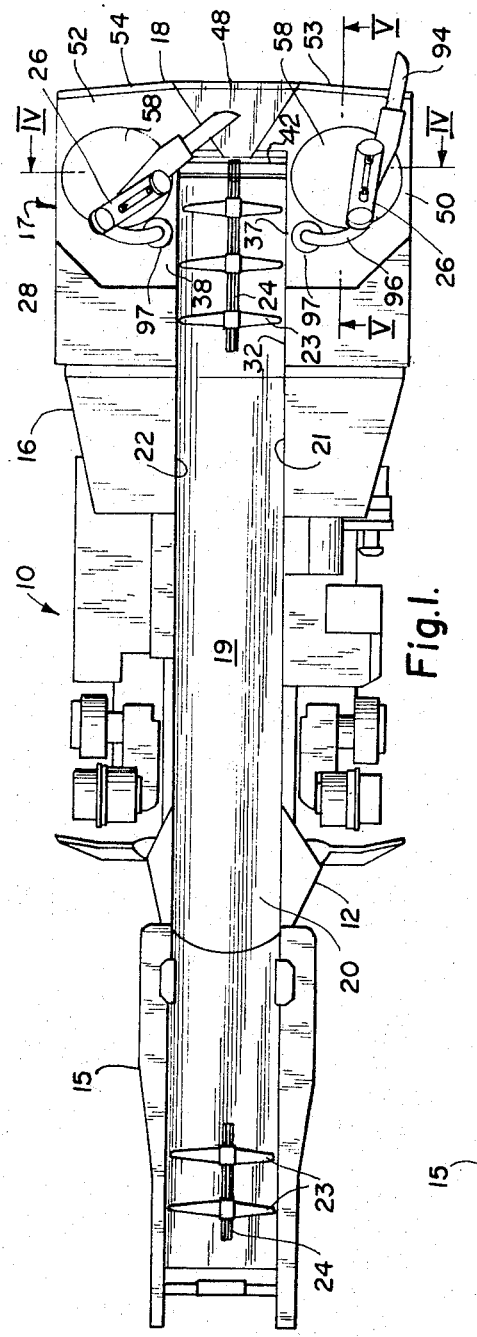
FIG. 1 is a top plan view of a loading machine embodying the present invention.
Figure 2:
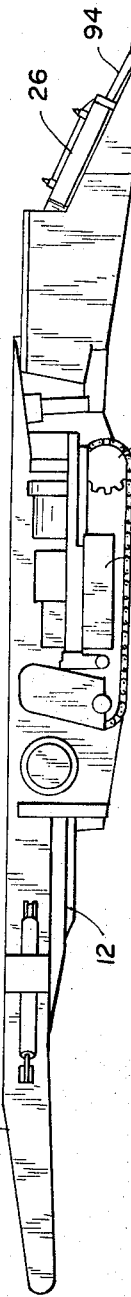
FIG. 2 is a side elevation view of a loading machine embodying the present invention.
Figure 3:
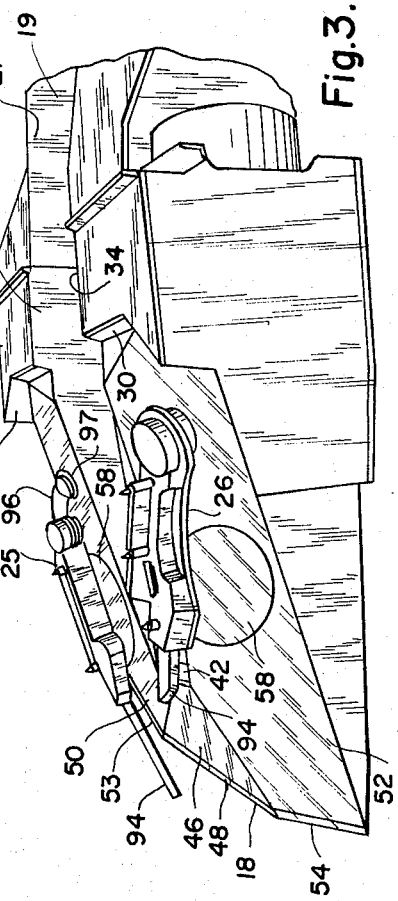
FIG. 3 is a perspective view of a gathering head of the loading machine embodying the present invention and showing further details of construction.

Referring now to the drawings, wherein like reference numerals refer to like parts throughout, there is shown a loading apparatus generally designated 10 having an elongated main frame 12 mounted on a mobile base 13 having oppositely laterally spaced ground engaging driven endless crawler tracks 14 (one of which is shown). The main frame 12 has a rear portion 15 which can be swung laterally, and a forward portion 16 of which is connected a gathering head section 17 having a front penetrating edge 18, which gathering head section can be vertically tilted between desired limits. An uninterrupted trough 19 having a base portion 20 and vertical parallel side walls 21 and 22 extends centrally along the main frame 12 from the rear end thereof to a forward portion of the gathering head section 17. An endless material transporting flight conveyor 23 having a single central driving chain 24 is arranged in trough 19, which conveyor 23 is suitably adapted by well known means to adjust for the lateral swinging of rear portion 15 of main frame 12 and/or the vertical tilting of gathering head portion 17. Gathering devices 25 and 26 are mounted on the gathering head section 17 on opposite sides of the trough 19 and are arranged to be driven in spaced endless paths extending forwardly beyond the penetrating edge 18 of gathering head section 17 and rearwardly to overlap a forward portion of conveyor 23.

Figure 4:
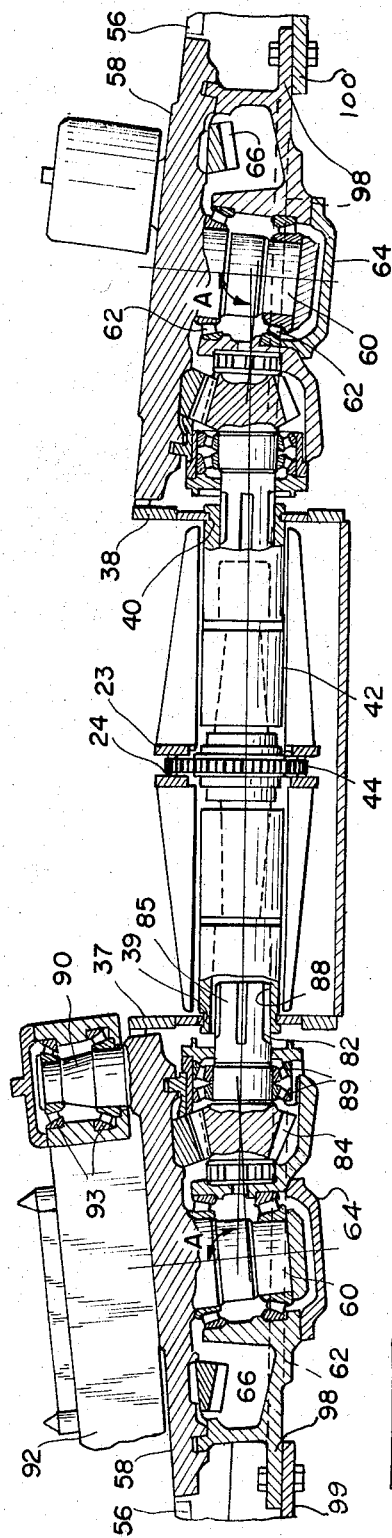
FIG. 4 is an enlarged cross sectional view taken essentially along line 4—4 of FIG. 1 with the drive disk rotated and certain parts omitted to more clearly show details of construction.
Figure 5:
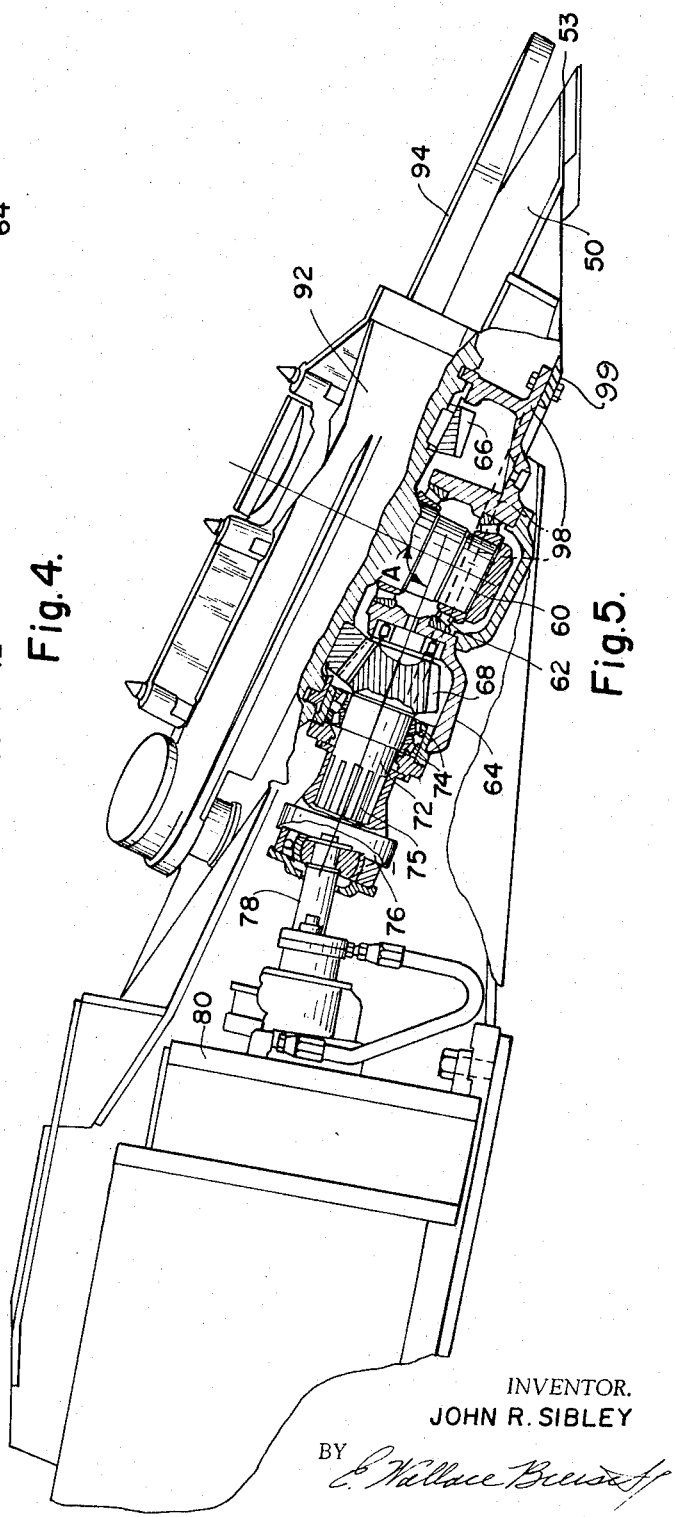
FIG. 5 is an enlarged cross sectional view taken on line 5—5 of FIG. 1 with certain parts omitted to more clearly show details of construction.

The gathering head section 17 to which the present invention is directed comprises flat rear plates 27 and 28 laterally arranged on opposite sides of trough 19 which plates have downwardly extending parallel forward walls 29 and 30, respectively. The plates 27 and 28 have inner edges extending longitudinally with respect to the trough 19 which edges are respectively fixed to vertical downwardly extending parallel front wall portions 32 and 34 of side walls 21 and 22 of trough 19, with the front wall portions 32 and 34 being connected at their lower vertical edges to forward portion 36 of base portion 20 of trough 19. The front wall portions 32 and 34 of side walls 21 and 22 and the forward portion 36 of base portion 20, respectively are detached from and suitably overlapped by the adjacent rearward portions of their respective walls and bases such that the gathering head section 17 may be tilted vertically while maintaining an uninterrupted trough 19. The forward portion 36 of base portion 20 is downwardly inclined with respect to the remainder of the base portion when the penetrating edge 18 of gathering head section 17 is in a ground engaging position. The front wall portions 32 and 34 of side walls 21 and 22 have forwardly downwardly tapering portions 37 and 38 which tapering portions are provided at their forwardmost portions with coaxial openings 39 and 40 (see FIG. 4), having their common center line disposed below and parallel to the front edge of forward portion 36 of base portion 20. The openings 39 and 40 receive the opposite ends of a drive or footshaft 42 having a centrally located sprocket 44 which meshes with driving chain 24 of conveyor 23. The footshaft 42 is driven in a manner which will be described hereinafter. Forwardly of the footshaft 42 is a downwardly inclined planar trapezoidal shaped ramp 46 having a longitudinal centerline disposed centrally of the main frame 12, which ramp terminates in a forward edge 48 extending transversely of main frame 12. The plane of the ramp 46 extended rearwardly includes the upper edges of the tapering portions 37 and 38 of front wall portions 32 and 34. Integral with the lower edges of the forward walls 29 and 30 of rear plates 27 and 28, and with the upper edges of tapered portions 37 and 38 of front wall portions 32 and 34, are flat planar decks 50 and 52, which decks extend outwardly from the lateral edges of the ramp 46 and laterally downwardly with respect to the plane of the ramp 46. The inner edges of the lower portions of the decks 50 and 52 are coextensive with the side edges of ramp 46 and establish the intersection therewith. The decks 50 and 52 terminate in extreme forward edges 53 and 54 respectively which intersect the forward edge 48 of ramp 46 and extend laterally rearwardly therefrom to form a trapezoidal penetrating edge 18 as viewed in plan. The angularity of the lateral inclinations of the decks 50 and 52 is equal to each other, and this embodiment is approximately 5°.

Gathering devices 25 and 26 are arranged on decks 50 and 52 respectively to be driven over and adjacent the surfaces thereof. The decks 50 and 52 together with the respective arrangements of gathering devices 25 and 26 thereon are identical in construction and, for sake of clarity, a description of deck 50 and gathering device 25 will be made with the understanding that such description also refers to deck 52 and gathering device 26. Generally towards the forward portion of deck 50 is a circular opening 56 suitably sized to rotatably receive a crank disk 58 having an upper surface flush with the surface of deck 50, which crank disk 58 is rotatable about an axis perpendicular to the surface of deck 50. Crank disk 58 has a downwardly extending axial shaft 60 integral therewith, which shaft is journaled in spaced upper and lower roller bearings 62 supported within an upstanding portion of a gear casing 64. Gear casing 64 is detachably secured to support members suitably disposed beneath the deck 50 and in a manner hereinafter described. Suitably fixed to crank disk 58 and on the lower surface thereof is an annular obtuse angle bevel gear 66 suitably sized to mesh with an obtuse angle bevel pinion 68 integral with a drive shaft 72. Drive shaft 72 extends rearwardly with respect to main frame 12 and has a centerline disposed generally longitudinally upwardly with respect to the longitudinal centerline of main frame 12. The drive shaft 72 is journalled for rotation in spaced roller bearings 74 supported within a longitudinally extending portion of gear casing 64. Integral with drive shaft 72 and at the free end 73 thereof is a spline shaft 75 which is connected with a spline of a flexible coupling 76 which in turn is engaged with an output shaft 78 of motor 80. A drive shaft 82 is disposed in gear casing 64 and has a centerline determined by the positioning of the motor 80 and is preferably at right angles with and intersecting the centerline of drive shaft 72 at a point on the centerline of shaft 60 of crank disk 58. Drive shaft 82 is identical in size and form with drive shaft 72, having an integral obtuse angle bevel pinion 84 meshing with bevel gear 66 and a spline shaft 85 which meshes with a spline 88 integral with and coaxial with foot shaft 42. Drive shaft 82 is journaled for rotation in spaced roller bearings 89 supported within a transverse portion of gear casing 64. As previously described, foot shaft 42 is operatively connected with driving chain 24 of conveyor 23 through sprocket 44, and thus conveyor 23 is driven simultaneously with crank disk 58 by motor 80. The centerlines of drive shafts 72 and 82 form the same angle, represented by the letter A, with the centerline of axial shaft 60, which angle A is greater than 90° by a magnitude equal to the lateral angle of inclination of deck 50, that is angle A is equal to 95°.

Gear casing 64 has an integral outwardly extending planar mounting flange 98 (partially shown) which flange is parallel to a plane established by the intersecting centerlines of drive shafts 72 and 82. Integral with gathering head 17 and below deck 50 is a planar support flange 99 suitably positioned for receiving the bottom surface of mounting flange 98 in abutting relationship, so that the upper surface of crank disk 58 is flush with the surface of deck 50. The gear casing 64 is detachably fixed with respect to gathering head 17 by securing the mounting flange 98 to support flange 99 by suitable means, such as bolts and nuts, for example. A planar support flange 100 is provided below the other deck 52 and is in the same form as support flange 99, with both of such support flanges being coplanar. The gear casing 64, including the mounting flange 98, is also symmetrical in shape and form about a plane normal thereto and at 45° between the centerlines of drive shafts 72 and 82 and including the intersection of such centerlines. Thus, the gear casing 64 is symmetrical with respect to a plane bisecting the angle between drive shafts 72 and 82 and containing the axis of the axial shaft 60. Thus, by maintaining angle A the same between the centerlines of axial shaft 60 and drive shafts 72 and 82, respectively, by sizing the drive shafts 72 and 82 the same, by making gear casing 64 symmetrical about a plane normal thereto and at 45° between the centerlines of drive shafts 72 and 82 and by making support flanges 99 and 100 coplanar and like in form, an entire assembly of gear casing 64, crank disk 58, and drive shafts 72 and 82, can be installed with respect to the other deck 52 by merely rotating the entire assembly by 90°.

Extending upwardly from an outer edge portion of the upper surface of crank disk 58 and integral therewith is a vertical shaft 90. Mounted on the shaft 90 is gathering arm 92 suitably supported by spaced roller bearings 93 for pivotal movement with respect to crank disk 58. The gathering arm 92 has its lower surface closely adjacent the upper surface of deck 50, which gathering arm 92 is provided with a forwardly projecting claw 94 similarly lying closely adjacent the surface of deck 50. The rear end of gathering arm 92 is pivotally connected with the forward end of curved link 96, and the rear end of link 96 is journaled to rotate within a bearing housing 97 suitably received in deck 50. The link 96 serves to compel movement of the gathering arm 92 in a predetermined path as the crank disk 58 is rotated so that gathering arm 92 has its claw 94 extended forwardly of deck 50 to gather material and move the material rearwardly along the surface of the deck 50 toward the front or receiving end of the conveyor 23. Since the gathering arm 92 and claw 95 are closely adjacent the surface of deck 50 an effective wiping action is attained, and with the deck 50 being laterally inclined with respect to the ramp 46 the gathering arm 92 will be elevated over the foot shaft 42 and the ramp 46 and thus any wedging of material between the gathering arm 92 and foot shaft 42 and ramp 46 will be minimized. The laterally inclined deck 50 also results in a greater material gathering floor area in comparison with a uniplanar longitudinally downwardly inclined gathering head. An increased depth of trough 19 in the region where the gathering arm 92 sweeps over the conveyor 23 also results thereby providing more capacity for material in this region, and further tending to minimize the wedging of material between the flights of conveyor 23 and the underside of gathering arm 92.

By providing a deck 50 laterally inclined with respect to ramp 46 a greater clearance is provided between the lower surface of crank disk 58 and the centerline of foot shaft 42 than was heretofore available with a uniplanar longitudinally downwardly inclined gathering head. Thus, larger and stronger obtuse angle bevel pinions such as 68 and 84 can be used, thereby providing stronger pinions for driving the crank disk 58 and foot shaft 42.

The arrangement of decks 50 and 52 with ramp 46 to provide a trapezoidal pointing of the penetrating edge 18 results in a reduction of force necessary to attack material for loading onto conveyor 23.

The angularity of the longitudinal and lateral inclinations of decks 50 and 52 and the longitudinal downward inclination of ramp 46 can be varied between minimum angles which would provide the results set forth above, and maximum angles beyond which material on the decks 50 and 52 and ramp 46 would tend to slide towards penetrating edge 18. The angle of inclination determining the material slide is, as is well known, dependent in part on the coefficients of friction of the type of material to be gathered and the surfaces of decks 50 and 52 and ramp 46.

Having described the preferred embodiment of my present invention in accordance with the patent statutes, it is to be realized that modifications may be made without departing from the broad scope of the invention. Accordingly, it is respectfully requested that the scope of this invention not be restricted to the specific form shown or uses mentioned except to the extent indicated in the appended claims.

What I claim is:

1. In a material loading apparatus having a material elevating and gathering head of the type utilizing a pair of forwardly located arm members, said gathering head having a central portion extending upwardly and rearwardly from a forward edge, and a side portion at each side of said central portion, said arm members being orbitable closely adjacent the upper surfaces of said side portion and cooperable therewith to discharge material centrally and rearwardly onto a conveyor means, the improvement comprising: each of said side portions being laterally outwardly and downwardly inclined with respect to said central portion and terminating in an extreme forward edge extending laterally and rearwardly from said forward edge of said central portion and substantially in a common plane therewith.

2. A material loading apparatus as set forth in claim 1 wherein the improvement further comprises; orbiting said arm members in a path such that substantial end portions of said arm members extend forwardly beyond said foremost edges throughout a portion of said path.

3. A material loading apparatus as set forth in claim 1 wherein the improvement further comprises; the surface of said central portion is planar and extends forwardly from adjacent the forward end of said conveyor means; and the surface of each of said side portions is planar.

4. In a material loading apparatus as set forth in claim 1 the improvement wherein said side portions have the same lateral downward inclination with respect to said central portion said path being such that substantial end portions of said arms extend forwardly beyond said edges throughout a portion of said path.

5. In a material loading apparatus as set forth in claim 1 the improvement further including each of said arm members having a driving means including a driver shaft rotatable about a first axis, a driving gear fixed with said driver shaft, a driven shaft rotatable about a second axis and operatively connected to drive said conveyor means, an intermediate gear means between said driver shaft and said driven shaft and forming a gear train therewith, said intermediate gear means having at least one member rotatable about a third axis of rotation said third axis being normal to said side portion, said first and second axes of rotation intersecting each other on said third axis and said first and second axes forming equal angles with said third axis, and each of said angles being greater than 90° by an amount substantially the same as the angle of said lateral downward inclination.

6. In a material loading apparatus as set forth in claim 5 the improvement wherein each of said drive means includes a mounting means having a planar surface parallel with a plane established by said first and second axes of rotation; said gathering head includes support means disposed beneath each of said side portions for receiving said mounting means, and said support means are coplanar.

7. In a material loading apparatus as set forth in claim 5 the improvement wherein said driver shaft and said driven shaft are interchangeable.

8. In a material loading apparatus as set forth in claim 1 the improvement further including a gear train comprising a driving means rotatable about an axis and a pair of output means rotatable thereby about other axes, respectively, said output means connected to said arm members and said conveyor means, respectively, and the said axis of that one of said output means connected to said arm members forming equal obtuse angles with each of the other of said axes.

9. In a material loading apparatus as set forth in claim 8 the further improvement wherein: said axis of said one output means is normal to the respective side portion.

10. In a material loading apparatus as set forth in claim 9 the further improvement wherein: each of said obtuse angles is greater than 90° by an amount substantially the same as the angle of said lateral downward inclination.

11. In a material loading apparatus as set forth in claim 8 the improvement further including a gear casing for said driving means, said gear casing being symmetrical with respect to a plane bisecting the angle between said first and second axes and containing said third axis.

References Cited

UNITED STATES PATENTS

| | | | |
|---|---|---|---|
| 2,880,842 | 4/1959 | Abraham | 198—10 |
| 2,696,288 | 12/1954 | Ball | 198—9 |
| 2,855,087 | 10/1958 | Eriksson | 198—9 |

FOREIGN PATENTS 845,026  7/1952  Germany.

EDWARD A. SROKA, *Primary Examiner.*

EVON C. BLUNK, *Examiner.*